US009030527B2

(12) United States Patent
Choi et al.

(10) Patent No.: US 9,030,527 B2
(45) Date of Patent: May 12, 2015

(54) METHOD FOR PROVIDING AND RECOGNIZING TRANSMISSION MODE IN DIGITAL BROADCASTING

(75) Inventors: Byeong Ho Choi, Yongin-si (KR); Je Woo Kim, Seongnam-si (KR); Hwa Seon Shin, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 30 days.

(21) Appl. No.: 13/989,320

(22) PCT Filed: Jan. 18, 2011

(86) PCT No.: PCT/KR2011/000357
§ 371 (c)(1),
(2), (4) Date: Jun. 4, 2013

(87) PCT Pub. No.: WO2012/070715
PCT Pub. Date: May 31, 2012

(65) Prior Publication Data
US 2013/0242050 A1    Sep. 19, 2013

(30) Foreign Application Priority Data

Nov. 27, 2010 (KR) ........................ 10-2010-0119242

(51) Int. Cl.
| H04N 15/00 | (2006.01) |
| H04N 13/00 | (2006.01) |
| H04N 5/775 | (2006.01) |
| H04N 21/434 | (2011.01) |
| H04N 21/81 | (2011.01) |

(52) U.S. Cl.
CPC ......... *H04N 13/004* (2013.01); *H04N 21/4345* (2013.01); *H04N 21/816* (2013.01)

(58) Field of Classification Search
USPC .......................................... 348/43
See application file for complete search history.

(56) References Cited

U.S. PATENT DOCUMENTS

| 8,248,461 | B2 | 8/2012 | Lee et al. |
| 8,493,434 | B2 | 7/2013 | Broberg |
| 2007/0183454 | A1 | 8/2007 | Kim et al. |
| 2008/0310499 | A1 | 12/2008 | Kim et al. |

(Continued)

FOREIGN PATENT DOCUMENTS

| KR | 10-2005-0111379 A | 11/2005 |
| KR | 10-2007-0061227 A | 6/2007 |
| KR | 10-2010-0060884 A | 6/2010 |

OTHER PUBLICATIONS

International Searching Authority: International Search Report for PCT/KR2011/000357, dated Nov. 24, 2011.

(Continued)

*Primary Examiner* — Hee-Yong Kim
(74) *Attorney, Agent, or Firm* — Sughrue Mion, PLLC

(57) ABSTRACT

The present invention relates to a method for selecting an appropriate mode when performing a new broadcast, such as a 3D stereo broadcast, a UHDTV broadcast, and a multi-view broadcast, among others, while maintaining compatibility with existing broadcasting channels in an MPEG-2-TS format for transmitting and receiving digital TV, and to a method for recognizing a descriptor. To this end, the present invention suggests providing the descriptor which is related to synthesizing left and right images using the type of stream, existence of the descriptor, and a frame-compatible mode flag.

6 Claims, 7 Drawing Sheets

(56) References Cited

U.S. PATENT DOCUMENTS

| | | |
|---|---|---|
| 2009/0141814 A1 | 6/2009 | Yin et al. |
| 2009/0225869 A1 | 9/2009 | Cho et al. |
| 2010/0134592 A1 | 6/2010 | Kim et al. |
| 2010/0182402 A1 | 7/2010 | Nakajima et al. |
| 2010/0238264 A1 | 9/2010 | Liu et al. |
| 2010/0260268 A1 | 10/2010 | Cowan et al. |
| 2010/0275238 A1 | 10/2010 | Nagasawa et al. |
| 2010/0277567 A1 | 11/2010 | Takizuka et al. |
| 2010/0315493 A1 | 12/2010 | Hamada |
| 2010/0325676 A1 | 12/2010 | Kim et al. |
| 2011/0181694 A1 | 7/2011 | Kim et al. |
| 2012/0044324 A1* | 2/2012 | Lee et al. ......... 348/43 |
| 2012/0106921 A1 | 5/2012 | Sasaki et al. |

OTHER PUBLICATIONS

Office Action issued in U.S. Appl. No. 14/104,823 on Mar. 21, 2014.
Office Action issued in U.S. Appl. No. 14/104,868 on Apr. 25, 2014.
Office Action issued in U.S. Appl. No. 13/989,678 on May 1, 2014.

* cited by examiner

FIG.4

```
                                    Syntax
TS_program_map_section( ) { }
            table_id
            section_syntax_indicator
            0
            reserved
            section_length
            program_number
            reserved
            version_number
            current_next_indicator
            section_number
            last_section_number
            reserved
            PCR_PID
            reserved
            program_info_length
            for (i = 0; i < N; i++) {
                        existing descriptor()s
                        // descriptor related to synthesis information regarding left and right images
                        service_compatible_stereoscopic_video_descriptor( )
                        // frame packing arrangement <- frame-compatible mode descriptor
                        MPEG2_video_3d_frame_frame_packing_arrangement_descriptor ( )
            } for (i = 0; i < N; i++) {
                        stream_type
                        reserved
                        elementary_PID reserved
                        ES_info_length
                        for (i = 0; i < N2; i++) {
                                    existing descriptor()s
                                    //descriptor related to information regarding individual ESs of left and right images
                                    stereoscopic_stream_descriptor( )
                        }
            }
            CRC_32
}
```

METHOD FOR PROVIDING AND RECOGNIZING TRANSMISSION MODE IN DIGITAL BROADCASTING

TECHNICAL FIELD

The present invention relates to a method of selecting a transmission mode suitable when a new broadcast, such as a 3D stereoscopic broadcast, ultra high definition (UHD) TV broadcast, or multi-view broadcast, is provided while maintaining compatibility with existing broadcast channels in a MPEG-2 Transport Stream (TS) format for broadcasting used for digital TV transmission and reception and recognizing a descriptor.

BACKGROUND ART

In Korea, a standard of Advanced Television Systems Committee (ATSC) in North America, which is an 8-VSB system, was adopted as a terrestrial digital broadcast system in November 1997. Subsequently, related core technology has been developed, field tests have been carried out, and test broadcasting has been performed. Since 2001, existing analog broadcasting and digital broadcasting have been simultaneously performed. In 2012, however, switch to digital broadcasting will have been completed.

ATSC is an America committee developing a digital television broadcasting standard or a standard of the committee. The standard of ATSC has been used as a national standard in America, Canada, Mexico, and Korea. In addition, the standard of ATSC will be adopted in other countries, including several nations in South America. In addition to ATSC, DVB, which has been developed in Europe, and ISDB of Japan are used as the standard of the digital broadcasting.

According to an ATSC digital broadcasting standard that is capable of transmitting high-quality video, audio, and auxiliary data, data are transmitted at a data transmission rate of 19.39 Mbps for a terrestrial broadcast channel of 6 MHz and data are transmitted at a data transmission rate of 38 Mbps for a cable TV channel. An ISO/IEC 13818-2 MPEG-2 video standard is used as a video compression technology used in the ATSC system. MPEG-2 MP@HL, i.e. Main Profile and High Level, is used as a compression format. Video formats and limitations related thereto are defined.

Hereinafter, a description will be given of transmission modes which may be used when a new broadcast, such as a 3D stereoscopic broadcast, ultra high definition (UHD) TV broadcast, or multi-view broadcast, is provided while maintaining compatibility with existing broadcast channels in a MPEG-2 TS format for broadcasting used for digital TV transmission and reception. Hereinafter, the 3D stereoscopic broadcast, UHD TV broadcast, and multi-view broadcast will be referred to as a composite image broadcast. Transmission modes which may be used in the MPEG-2 TS format are divided into a frame-compatible mode and a service-compatible mode. In a case in which two transmission modes are used in a digital broadcast, it is necessary for a receiving end to recognize a transmission mode used by a transmission end.

DISCLOSURE

Technical Problem

An object of the present invention is to provide a method of enabling a receiving system capable of processing a composite image broadcast including a 3D stereoscopic broadcast, ultra high definition (UHD) TV broadcast, or multi-view broadcast to recognize reception of composite images such that the receiving system receives and processes the composite images.

Another object of the present invention is to provide a method of enabling a receiving system not capable of processing composite images to disregard reception of the composite images, thereby preventing malfunction of the receiving system.

Technical Solution

In accordance with an aspect of the present invention, the above objects may be accomplished by the provision of a method of providing a descriptor related to synthesis of left and right images using stream type.

In accordance with another aspect of the present invention, there is provided a method of providing a descriptor related to synthesis of left and right images using presence and absence of a descriptor.

In accordance with a further aspect of the present invention, there is provided a method of providing a descriptor related to synthesis of left and right images using a frame-compatible mode flag.

Advantageous Effects

In a method of providing a transmission mode according to the present invention, it is possible to distinguish between a frame-compatible mode and a service-compatible mode using the same descriptor. In addition, it is possible to enable a receiving system capable of processing composite images to recognize reception of the composite images such that the receiving system receives and processes the composite images. Furthermore, it is possible to enable a receiving system not capable of processing composite images to disregard reception of the composite images, thereby preventing malfunction of the receiving system.

DESCRIPTION OF DRAWINGS

FIG. 4 is a view showing the structure of a program map table (PMT) syntax according to an embodiment of the present invention;

DESCRIPTION OF THE REFERENCE NUMERALS

FIG. 2: Frame-compatible mode FIG. 3: Service-compatible mode

BEST MODE

The above and other aspects of the present invention will be more clearly understood from the following detailed description of preferred embodiments taken in conjunction with the accompanying drawings. Hereinafter, the detailed description of the preferred embodiments of the present invention will be given to enable those skilled in the art to easily understand and reproduce the invention.

First, types of digital broadcasts will be described. Generally, digital broadcasts are classified into a 3-D stereoscopic broadcast, an Ultra High Definition (UHD) TV broadcast, and a Multi-view broadcast.

Figure 1:
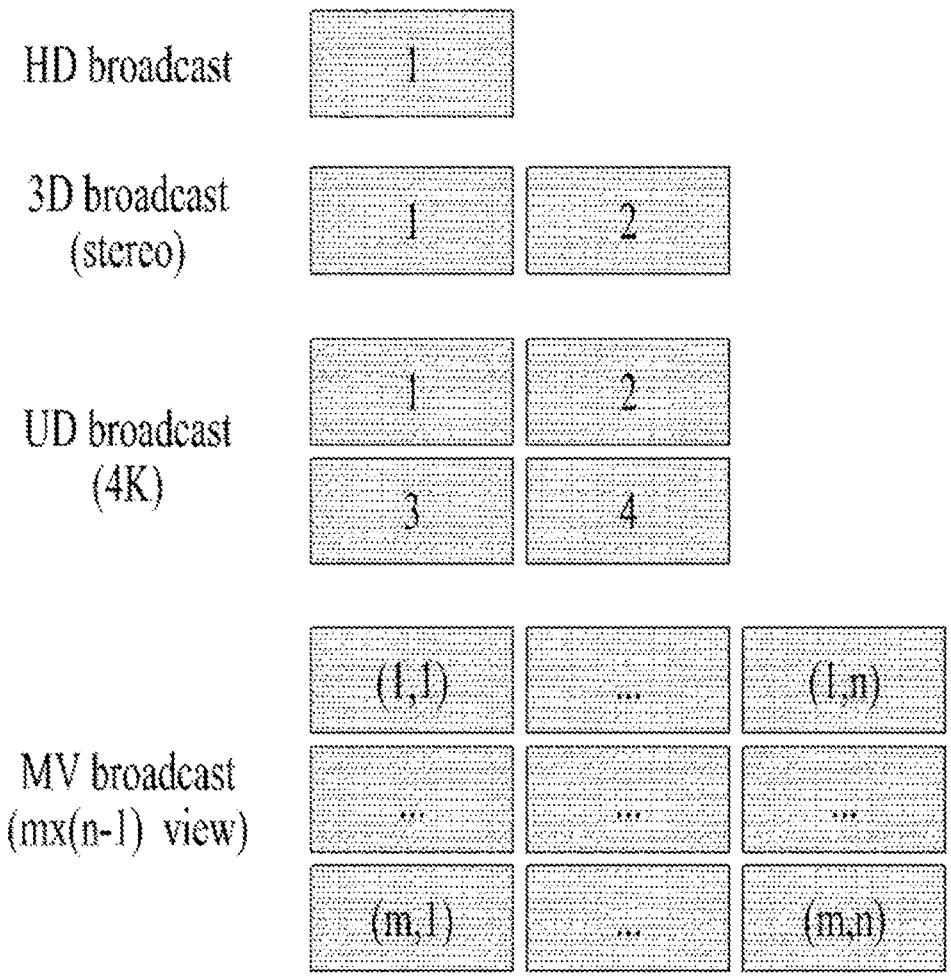
FIG. 1 is a block diagram showing a HD broadcast, 3D broadcast, UD broadcast, and MV broadcast.

FIG. 1 is a block diagram showing a HD broadcast, 3D broadcast, UD broadcast, and MV broadcast. Hereinafter, a 3D stereoscopic broadcast, UHD TV broadcast, and multi-view broadcast will be referred to as a composite image broadcast.

An HD broadcast transmits one image. However, the 3-D stereoscopic broadcast transmits two images, the UHD broadcast transmits four images (in case of 4 k), and the multi-view broadcast transmits two or more images.

The 3-D stereoscopic broadcast is a method of assigning a Packet Identifier (PID) for MPEG-2 TS to left and right images and performing multiplexing transmission to transmit a stereo type three-dimensional stereoscopic image. A UHD image generally has a number of horizontal and vertical pixels ranging from 4000 level (4 k·3840×2160) to 8000 level (8 k·7680×4320). Since image resolution depends upon the number of pixels, the 4 k-based UHD image is four times clearer than an HD image (2 k·1920×1080). The 8 k-based UHD image is sixteen times clearer than the HD image. The HD image has a refresh rate, i.e. the number of frames per second, of 30 Hz. In the UHD image, on the other hand, 60 images are transmitted per second, thereby realizing much more natural and dynamic images.

In the multi-view broadcast, two images, such as top and bottom images or left and right images, having angles different according to a users' viewing angle are combined such that the users view a 3-D stereoscopic image. In a case in which a television is provided with a multi-view display device, a left person views a left face of a performer and a right person views a right face of the performer when the performer appears on a screen. That is, the multi-view broadcast is an advanced type of the 3-D stereoscopic broadcast.

The present invention proposes a method of selecting a transmission mode suitable to perform a new broadcast while maintaining compatibility with an existing broadcast channel when using any one selected from among the 3-D stereoscopic broadcast, the UHD TV broadcast, and the multi-view broadcast.

Hereinafter, a frame-compatible mode, which is one of the transmission modes, will be described first and then a service-compatible mode, which is another of the transmission modes, will be described.

Figure 2A:
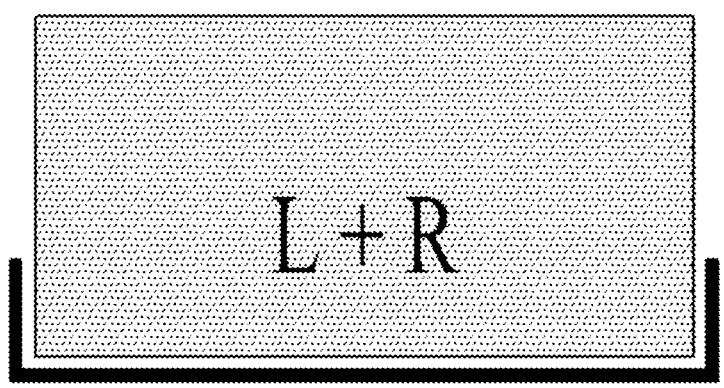
FIG. 2 is a view showing a frame-compatible mode according to an embodiment of the present invention.
Figure 2B:
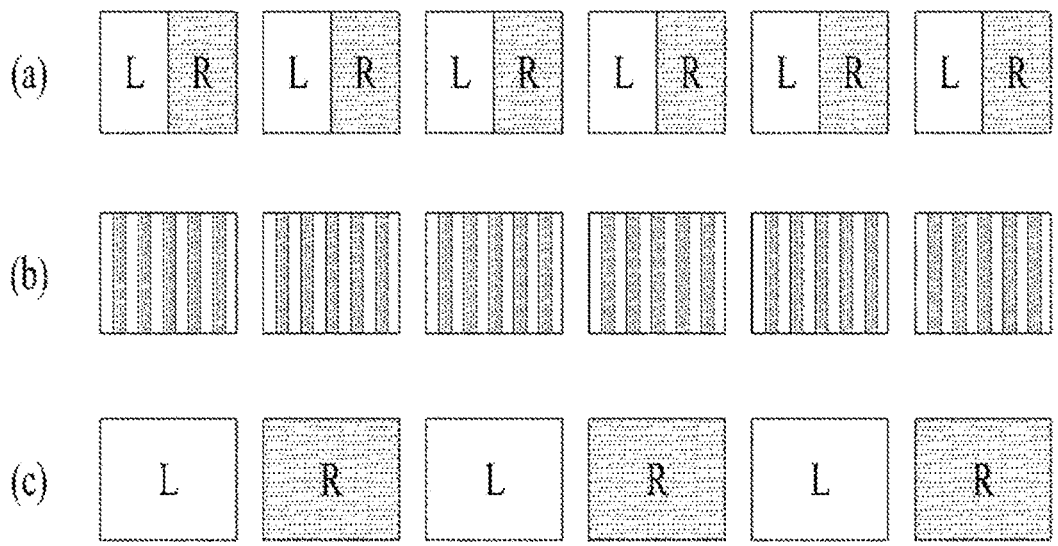

FIG. 2A shows a frame-compatible mode and FIG. 2B shows examples of methods of synthesizing images to configure the frame-compatible mode. FIGS. 2A and 2B show an example of a 3-D stereoscopic broadcast. However, the present invention may be extended to a UHD TV broadcast and a multi-view broadcast in a similar manner. Hereinafter, the frame-compatible mode will be described in detail with reference to FIGS. 2A and 2B.

Referring to FIG. 2B, a frame containing combined left and right images is transmitted through a transmission band in the frame-compatible mode. Consequently, a transmission and reception form identical to a form used in a conventional HD broadcast may be maintained. However, the broadcast in the frame-compatible mode is different from the conventional HD broadcast in that the conventional HD broadcast transmit a video to the entire region but the broadcast in the frame-compatible mode transmits an image synthesized based on the number of images. That is, as shown in FIG. 2B, a left image and a right image may be synthesized into a frame using various methods. As shown in FIG. 2B(a), a frame may be divided into two halves and then synthesized. As shown in FIG. 2B(b), a frame may be divided in pixel steps and then synthesized. Alternatively, as shown in FIG. 2B(c), left and right images may be sequentially transmitted while a frame is maintained. In FIGS. 2B(a) and 2B(b), a specific number of images are synthesized into a frame; therefore, a process of reducing each image is necessary. In FIG. 2B(c), a frame-rate is increased; therefore, it is necessary to increase a bandwidth or to adjust a video compression bitrate. There are various methods of synthesizing images. In the 3-D stereoscopic image as shown in FIG. 2B, the left image and the right image may be changed or the images may be mixed in diagonal pixel steps.

In the 3-D stereoscopic broadcast, for example, both the left image and the right image are transmitted through one transmission band. Consequently, the 3-D stereoscopic broadcast has an half lower image resolution than in a case in which an image frame is transmitted with the result that image quality is deteriorated (FIGS. 2B(a) and 2B(b)). Otherwise, much more data must be transmitted in the same bandwidth. To this end, it is necessary to increase a compression rate with the result that image quality is deteriorated or a frame rate is lowered (FIG. 2B(c)).

Figure 3:
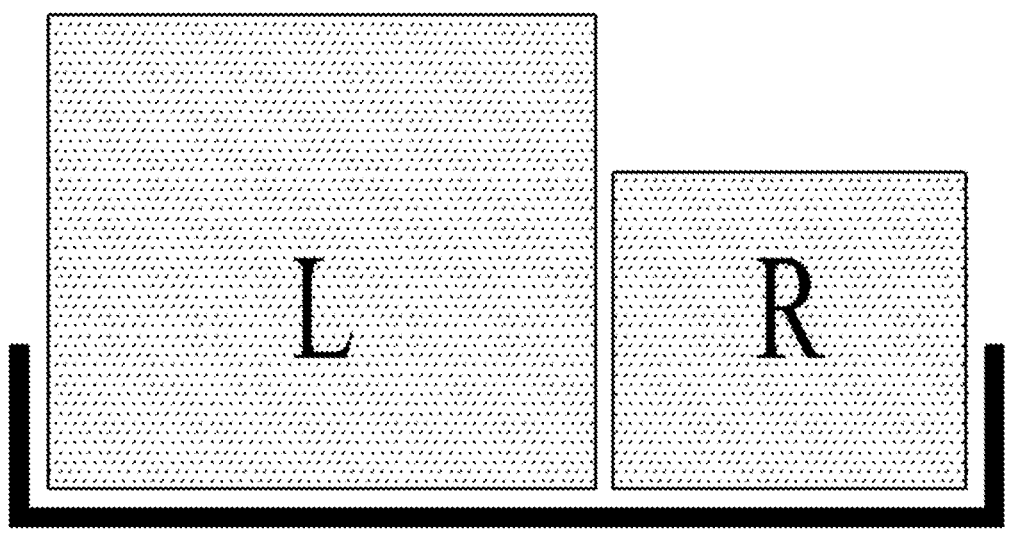
FIG. 3 is a view showing a service-compatible mode according to an embodiment of the present invention.

FIG. 3 shows a service-compatible mode. Hereinafter, the service-compatible mode will be described in detail with reference to FIG. 3. FIG. 3 shows an example of a 3-D stereoscopic broadcast. However, the present invention may be extended to a UHD TV broadcast and a multi-view broadcast in a similar manner.

Referring to FIG. 3, a left image frame and a right image frame are individually compressed and transmitted through a transmission band without image synthesis in the service-compatible mode. That is, as shown in FIG. 3, the left image frame and the right image frame are compressed using corresponding compression methods and the compressed left image frame and right image frame are transmitted through one transmission band. In order to transmit two or more compressed images through a limited transmission band, one of the image is compressed so as to be compatible with an existing HD broadcast, whereas the other image is transmitted while being coded using a compression method having a higher compression rate. Alternatively, one of the left and right images is transmitted in a high resolution state and the other image is transmitted in a low resolution state. As an example, the left image is transmitted while being coded using MPEG-2 Main profile and the right image is transmitted while being coded using MPEG-4 AVC/H.264 High profile. In a case in which low resolution is used, an image stream of the left image is transmitted at a resolution of 1080i@60 Hz using the above coding method and an image stream of the right image is transmitted at a resolution of 720p@60 Hz using the above coding method. In addition, the right image is sub-sampled in the vertical or horizontal direction while the left image is not changed and a receiving unit restores the sampled right image so as to correspond to the resolution of the left image to form one stereoscopic image.

When a new broadcast is performed while maintaining compatibility with an existing broadcast channel in the digital broadcast as described above, a transmission mode of a composite broadcast is divided into a frame-compatible mode and a service-compatible mode. An transmission end transmits a compressed image to a receiving end using one of the two transmission modes. The receiving end must recognize the transmission mode used by the transmission end to decode the received compressed image. An existing broadcast receiving system that is not capable of processing the composite images disregards a secondary video of the received composite images and reproduces only a primary video of the received composite images. Consequently, it is possible to selectively receive the composite broadcast while maintaining compatibility with the existing broadcast channel.

In an embodiment of the present invention, a receiving system that is capable of processing a 3D image receives identification information to recognize the reception of a 3D image while the identification information is contained in system information. Program Specific Information/Program and System Information Protocol (PSI/PSIP) is applied as system information; however, the present invention is not limited thereto. That is, any protocol transmitting system information as a table format may be applied to the present invention irrespective of the term thereof.

PSI is a system standard of MPEG-2 defined to classify channels and programs. PSIP is a standard of Advanced Television Systems Committee (ATSC) that is capable of classifying channels and programs.

In an embodiment, PSI may include a Program Association Table (PAT), Conditional Access Table (CAT), Program Map Table (PMT), and Network Information Table (NIT).

PAT is specific information transmitted by a packet having a PID of 0. PID information of PMT and PID information of NIT are transmitted for each program by using the PAT. CAT transmits information regarding a charged broadcast system used by the transmission side. PMT transmits PID information of a transport stream packet to transmit individual bitstreams of video and audio constituting a program, program identification number and PID information to transmit PCR. NIT transmits information of a real transmission network. For example, a PAT table having a PID of 0 is parsed to find program number and PID of PMT. PMT obtained from PAT is parsed to know a correlation between components constituting the program.

FIG. 4 is a view showing the structure of a program map table (PMT) syntax according to an embodiment of the present invention. Hereinafter, the structure of a program map table (PMT) syntax according to an embodiment of the present invention will be described in detail with reference to FIG. 3.

Referring to FIG. 4, a table_id field is a table identifier. An identifier to identify PMT may be set. A section_syntax_indicator field is an indicator to define a section form of PMT. A section_length field indicates the section length of PMT.

A program_number field indicates program number as information coinciding with PAT. A version_number field indicates version number of PMT. A current_next_indicator field is an indicator to indicate whether the current table section is applicable.

A section_number field indicates section number of the current PMT section when PMT is transmitted while being divided into one or more sections. A last_section_number field indicates last section number of PMT. A PCR_PID field indicates PID of a packet that transmits program clock reference (PCR) of the current program.

A program_info_length field indicates length information of descriptors following the program_info_length field in bytes. That is, the program_info_length field indicates length of descriptors included in a first loop. A stream_type field indicates coding information and type of an elementary stream included in a packet having a PID value indicated by the following elementary_PID field. A elementary_PID field indicates an identifier of the elementary stream, i.e. a PID value of a packet including the elementary stream. An ES_Info_length field indicates length information of descriptors following the ES_Info_length field in bytes. That is, the ES_Info_length field indicates length of descriptors included in a second loop.

In addition, referring to FIG. 4, a descriptor related to synthesis information regarding left and right images for specific program number, i.e. a descriptor related to a transmission mode, is present in a descriptor following a program_info_length syntax. In addition, a descriptor related to individual ESs of left and right images is present in a descriptor following an ES_info_length syntax. Referring to FIG. 3, the descriptor related to synthesis information regarding left and right images is defined as service_compatible_stereoscopic_video_descriptor( ). Information related to frame packing arrangement describes MPEG2_vide_3d-frame_packing_arrangement_descriptor( ) defined in the frame-compatible mode. The descriptor related to the individual ESs of left and right images is defined as stereoscopic_stream_descriptor( ). Referring to FIG. 4, however, these descriptors are directly expressed in the syntax to indicate the positions of the descriptors. In fact, however, the descriptors are selectively included like conventional descriptors.

Referring to FIG. 4, the descriptor related to synthesis information regarding left and right images for specific program number is first configured and then the descriptor related to individual ESs of left and right images is configured; however, the present invention is not limited thereto. That is, MPEG2_video_3d_frame_frame_packing_arrangement_descriptor( ) may not be located at the current position but at a descriptor under ES_info_length. This is because one video PID is provided in the frame-compatible mode; therefore, the PID is present together with the descriptor. The positions of the descriptors of FIG. 4 may be variable as the position of MPEG2_video_3d_frame_frame_packing_arrangement_descriptor( ) is variable.

Hereinafter, a method of providing a descriptor related to synthesis of composite images will be described. The method of providing the descriptor related to synthesis of the composite images includes a method using stream type, a method using presence and absence of the descriptor, and a method of confirming a frame-compatible mode flag. Of course, a descriptor related to synthesis of left and right images may be provided using methods other than the above methods.

First, a method using stream type will be described. Table 1 below illustrates stream type for a 3D stereoscopic broadcast in PSI.

TABLE 1

| Value | Description |
|---|---|
| 0x00 | ITU-T/ISO-IEC Reserved |
| 0x01 | ISO/IEC 11172-2 Video |
| 0x02 | ITU-T Rec. H.262/ISO/IEC 13818-2 Video or ISO/IEC 11173-2 constrained parameter video stream |
| 0x03 | ISO/IEC 11172-3 Vudio |

TABLE 1-continued

| Value | Description |
| --- | --- |
| Ox04 | ISO/IEC 13818-3 Vudio |
| ... | ... |
| Ox0A | ISO/IEC 13818-6 type-A |
| ... | ... |
| Ox22 | ITU-T Rec. H.262/ISO/IEC 13818-2 Video with stersoscopic count coded using frame-compatible mode |
| Ox23 | ITU-T Rec. H.262/ISO/IEC 13818-2 Video with stersoscopic count coded using service-compatible mode |
| ... | ... |
| Ox80-OxFF | User Private |

A descriptor related to synthesis of left and right images is provided using stream type indicated in Table 1. That is, if stream type is Ox02, it indicates a 2D image. If stream type is Ox22 and Ox23, it indicates a 3D stereoscopic image. For example, if stream type is Ox22, it indicates a frame-compatible mode. If stream type is Ox23, it indicates a service-compatible mode.

Consequently, a receiving end may confirm the stream type of the received PSI to distinguish between the frame-compatible mode and the service-compatible mode. In addition, the receiving end may receive a descriptor related to synthesis of left and right images.

The second method is a method using presence and absence of the descriptor. That is, if a descriptor related to a frame-compatible mode is present, it means that the corresponding image is transmitted in the frame-compatible mode. If a descriptor related to a service-compatible mode is present, it means that the corresponding image is transmitted in the service-compatible mode. That is, the second method provides a descriptor related to synthesis of left and right images using presence or absence of a descriptor related to a specific mode. Referring to FIG. 4, if a descriptor for the service-compatible mode, such as service_compatible_stereoscopic_video_descriptor( ), is present in a 3D stereoscopic broadcast, the service-compatible mode is distinguished. If a descriptor for the frame-compatible mode, such as MPEG2_video_3d-frame_packing_arrangement_descriptor( ), is present, the frame-compatible mode is distinguished.

The third method is a method of confirming a frame-compatible mode flag. That is, a frame-compatible mode flag is confirmed to provide a descriptor related to synthesis of composite images.

Table 2 indicates an example of a frame-compatible mode flag of a 3D stereoscopic broadcast according to an embodiment of the present invention.

TABLE 2

```
MPEG2_video_3d_stereoscopic_descriptor{
    descriptor_tag
    descriptor_length
        {syntaxes common to modes}
        frame_compatible_mode_flag
    If (frame_compatible_mode_flag) {
        {syntaxes for Frame-Compatible mode }
    }
    else {
        {syntaxes for Service-Compatible mode }
    }
}
```

As indicated in Table 2, a frame_compatible_mode_flag syntax may be provided and divided into detailed syntaxes in the descriptor according to supporting methods. Consequently, the syntax in the descriptor may be divided into {syntaxes common to modes}, {syntaxes for Frame-Compatible mode}, and {syntaxes for Service-Compatible mode}. As described above, the third method provides a descriptor related to synthesis of composite images using a descriptor flag. Of course, a service-compatible flag may be defined and used instead of the frame-compatible flag according to circumstances. Alternatively, a method of additionally assigning a mode bit (for example, a frame-compatible mode if the mode bit is 1 and a service-compatible mode if the mode bit is 2 may be used instead of using the flag. However, these methods are included in technology for division into the frame-compatible mode and the service-compatible mode.

Figure 5:
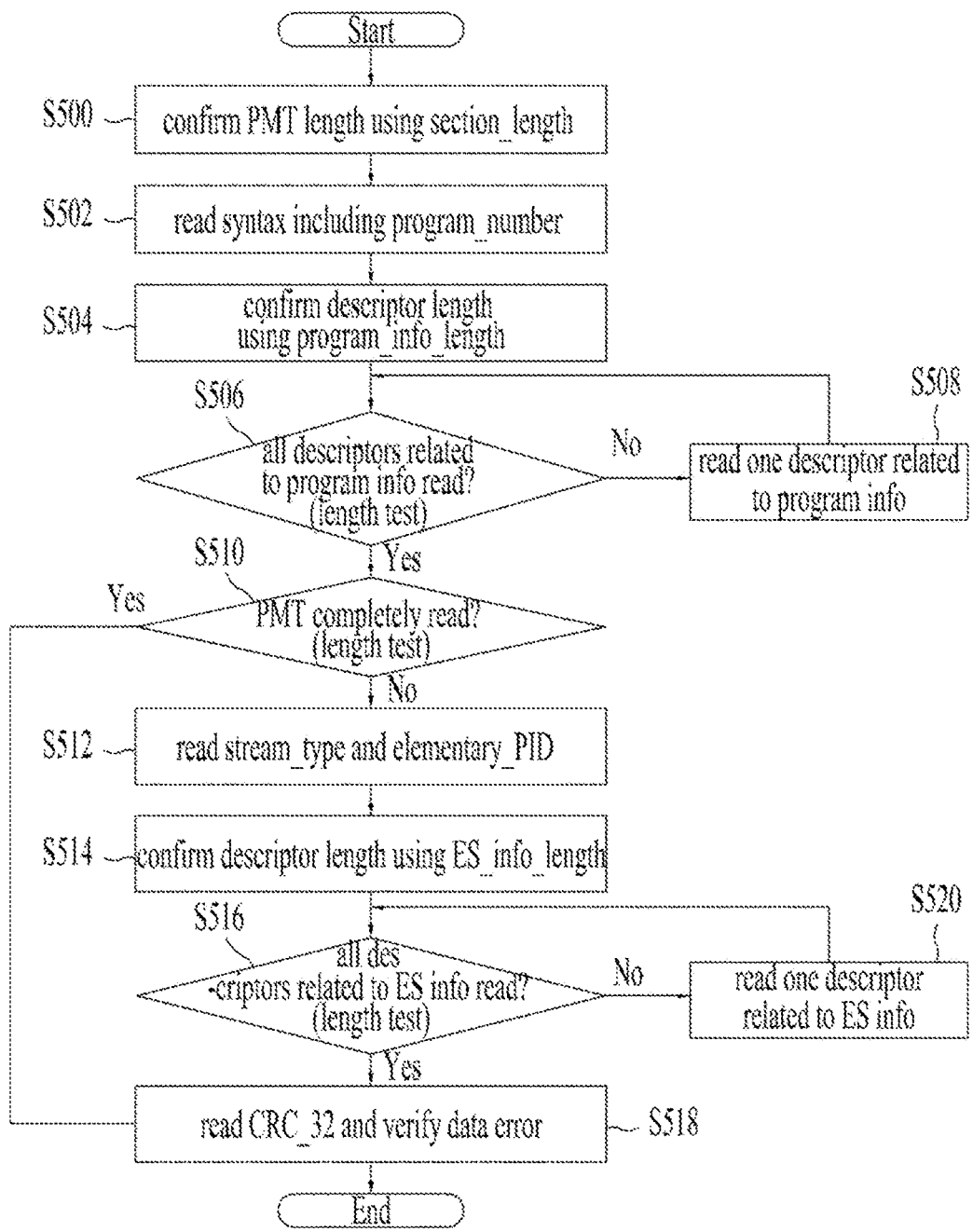
FIG. 5 is a view showing a procedure of the PMT.

FIG. 5 is a view showing a procedure of the PMT. Hereinafter, a procedure of the PMT will be described with reference to FIG. 5.

At S500, a PMT length is confirmed using section_length.

At S502, a syntax including program_number is read.

At S504, a descriptor length is confirmed using program_info_length.

At S506, it is confirmed whether all descriptors related to program info have been read. If all descriptors have been read, the procedure moves to S510. If all descriptors have not been read, the procedure moves to S508, where one descriptor related to program info is read.

At S510, it is confirmed whether the PMT has been completely read. If the PMT has been completely read, the procedure moves to S510. If the PMT has not been completely read, the procedure moves to S512. At S512, stream_type and elementary_PID are read.

At S514, a descriptor length is confirmed using ES_info_length.

At S516, it is confirmed whether all descriptors related to ES info have been read. If all descriptors have been read, the procedure moves to S518. If all descriptors have not been read, the procedure moves to S520.

At S520, one descriptor related to ES info is read and the procedure moves to S516. At S518, CRC_32 is read and a data error is verified.

Figure 6:
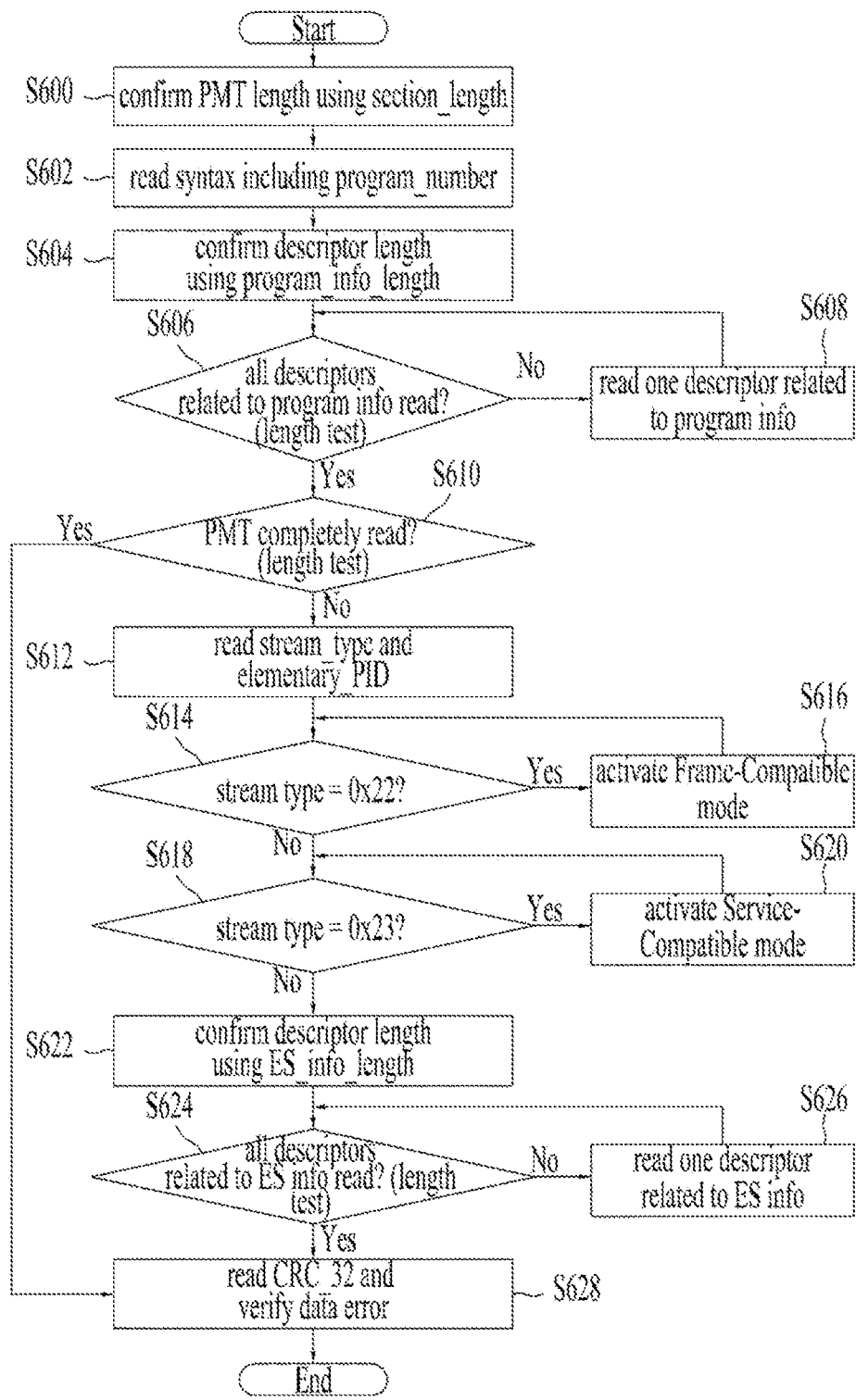
FIG. 6 is a flowchart showing a process of providing a descriptor related to synthesis of left and right images using stream type according to an embodiment of the present invention.

FIG. 6 is a flowchart showing a process of providing a descriptor related to synthesis of left and right images using stream type according to an embodiment of the present invention. Hereinafter, a process of providing a descriptor related to synthesis of left and right images using stream type according to an embodiment of the present invention will be described with reference to FIG. 6.

At S600, a PMT length is confirmed using section_length.

At S602, a syntax including program_number is read.

At S604, a descriptor length is confirmed using program_info_length.

At S606, it is confirmed whether all descriptors related to program info have been read. If all descriptors have been read, the procedure moves to S610. If all descriptors have not been read, the procedure moves to S608, where one descriptor related to program info is read.

At S610, it is confirmed whether the PMT has been completely read. If the PMT has been completely read, the procedure moves to S628. If the PMT has not been completely read, the procedure moves to S612. At S612, stream_type and elementary_PID are read.

At S614, it is confirmed whether stream type is 0x22. If stream type is 0x22, the procedure moves to S616. If stream type is not 0x22, the procedure moves to S618.

At S616, a Frame-Compatible mode is activated.

At S618, it is confirmed whether stream type is 0x23. If stream type is 0x23, the procedure moves to S620. If stream type is not 0x23, the procedure moves to S622.

At S620, a Service-Compatible mode is activated.

At S622, a descriptor length is confirmed using ES_info_length.

At S624, it is confirmed whether all descriptors related to ES info have been read. If all descriptors have been read, the procedure moves to S610. If all descriptors have not been read, the procedure moves to S626.

At S626, one descriptor related to ES info is read and the procedure moves to S624. At S628, CRC_32 is read and a data error is verified.

Figure 7:
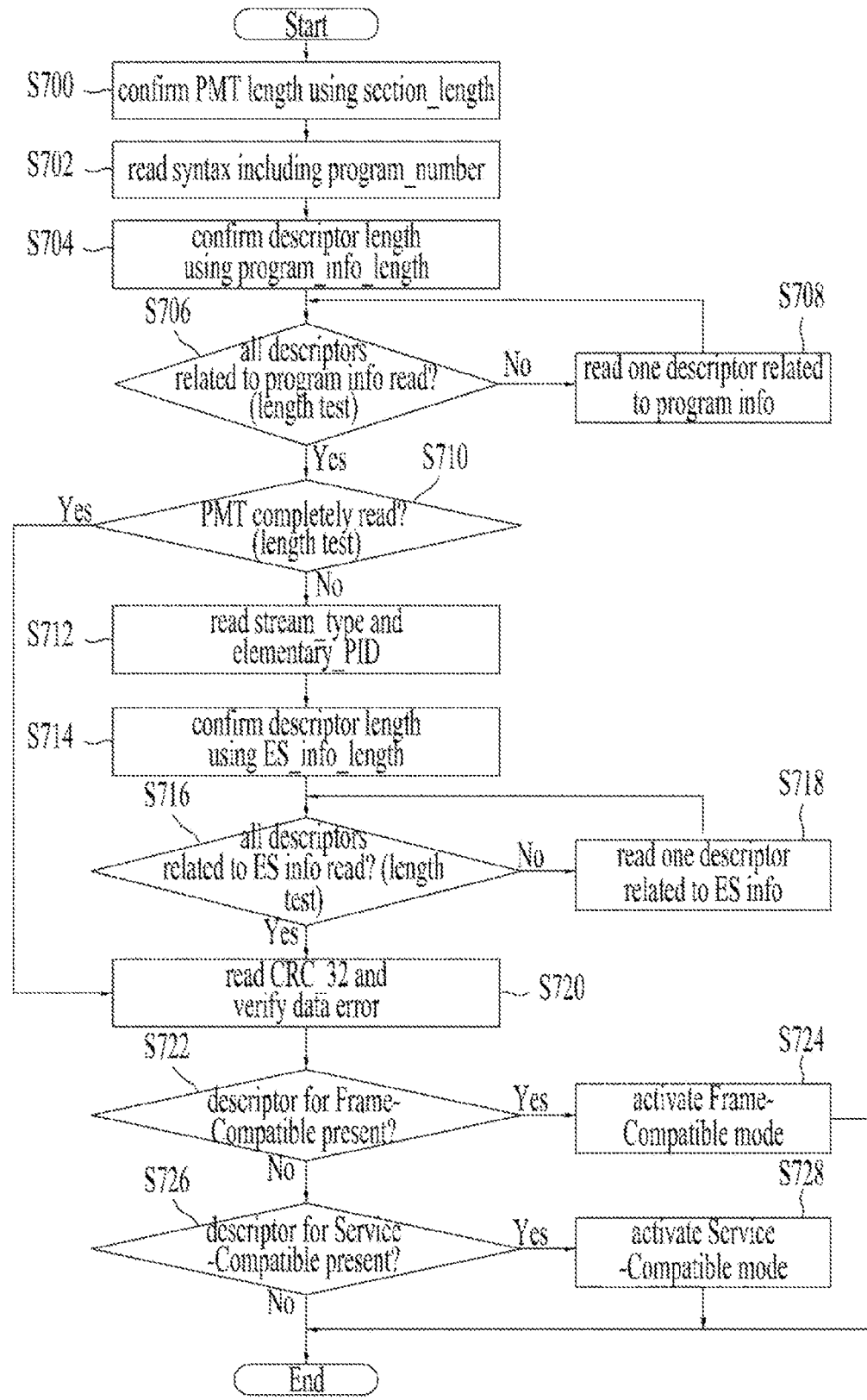
FIG. 7 is a flowchart showing a process of providing a descriptor related to synthesis of left and right images using presence and absence of a descriptor according to an embodiment of the present invention.

FIG. 7 is a flowchart showing a process of providing a descriptor related to synthesis of left and right images using presence and absence of a descriptor according to an embodiment of the present invention. Hereinafter, a process of providing a descriptor related to synthesis of left and right images using presence and absence of a descriptor according to an embodiment of the present invention will be described with reference to FIG. 7.

At S700, a PMT length is confirmed using section_length.

At S702, a syntax including program_number is read.

At S704, a descriptor length is confirmed using program_info_length.

At S706, it is confirmed whether all descriptors related to program info have been read. If all descriptors have been read, the procedure moves to S710. If all descriptors have not been read, the procedure moves to S708, where one descriptor related to program info is read.

At S710, it is confirmed whether the PMT has been completely read. If the PMT has been completely read, the procedure moves to S720. If the PMT has not been completely read, the procedure moves to S712. At S712, stream_type and elementary_PID are read. At S714, a descriptor length is confirmed using ES_info_length.

At S716, it is confirmed whether all descriptors related to ES info have been read. If all descriptors have been read, the procedure moves to S710. If all descriptors have not been read, the procedure moves to S718.

At S718, one descriptor related to ES info is read and the procedure moves to S716. At S720, CRC_32 is read and a data error is verified.

At S722, it is confirmed whether a descriptor for Frame-Compatible is present. If a descriptor for Frame-Compatible is present, the procedure moves to S724, where a Frame-Compatible mode is activated.

If a descriptor for Frame-Compatible is not present, the procedure moves to S726, where it is confirmed whether a descriptor for Service-Compatible is present. If a descriptor for Service-Compatible is present, the procedure moves to S728, where a Service-Compatible mode is activated.

Figure 8:
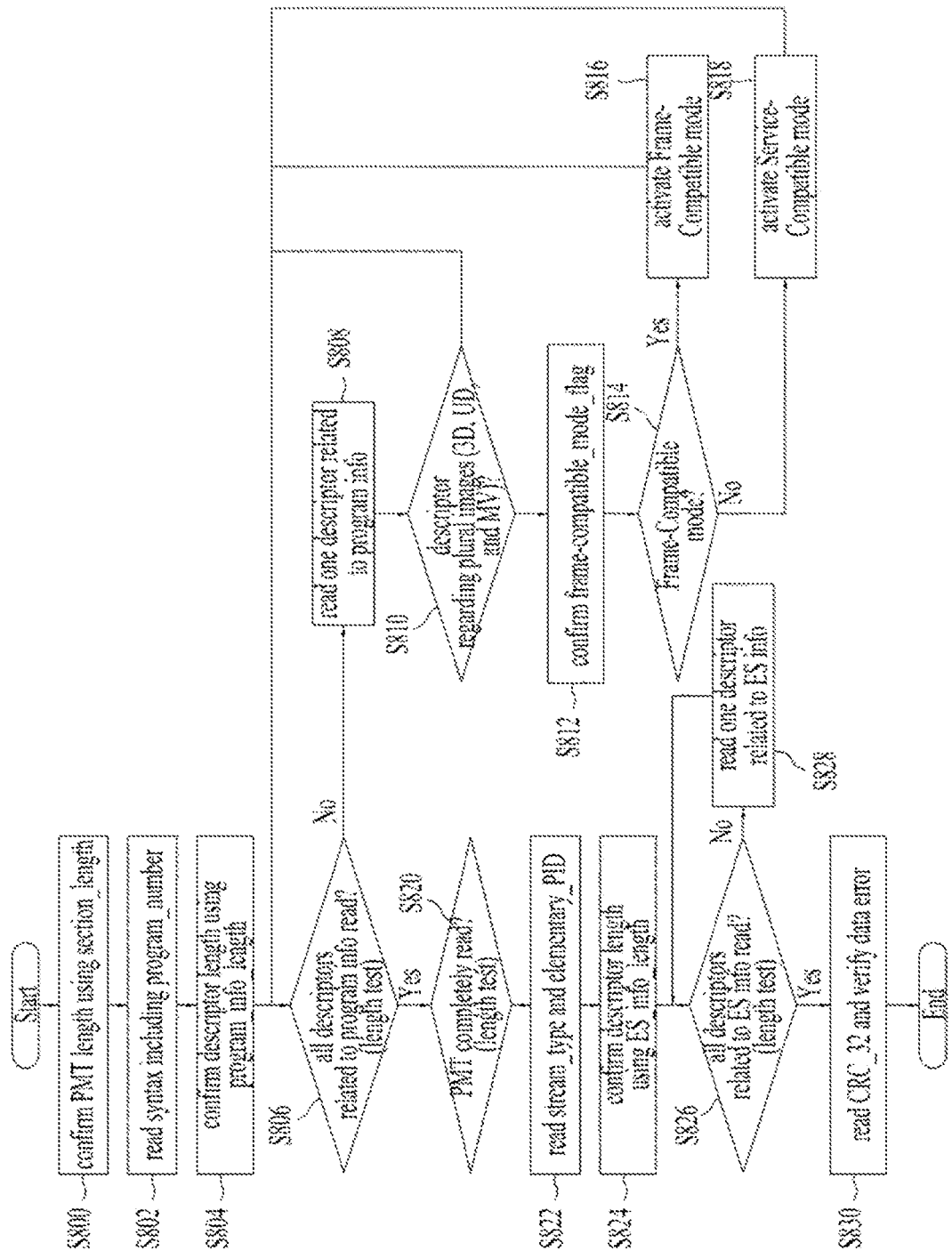
FIG. 8 is a flowchart showing a process of providing a descriptor related to synthesis of left and right images using a frame-compatible mode flag according to an embodiment of the present invention.

FIG. 8 is a flowchart showing a process of providing a descriptor related to synthesis of left and right images using a frame-compatible mode flag according to an embodiment of the present invention. Hereinafter, a process of providing a descriptor related to synthesis of left and right images using a frame-compatible mode flag according to an embodiment of the present invention will be described with reference to FIG. 8.

At S800, a PMT length is confirmed using section_length.

At S802, a syntax including program_number is read.

At S804, a descriptor length is confirmed using program_info_length.

At S806, it is confirmed whether all descriptors related to program info have been read. If all descriptors have been read, the procedure moves to S820. If all descriptors have not been read, the procedure moves to S808, where one descriptor related to program info is read.

At S810, it is confirmed whether the read descriptor is a descriptor regarding plural images (3D, UD, and MV). If the read descriptor is a descriptor regarding plural images, the procedure moves to S812. If the read descriptor is not a descriptor regarding plural images, the procedure moves to S806.

At S812, frame-compatible_mode_flag is confirmed. At S814, a Frame-Compatible mode is confirmed. If the Frame-Compatible mode is confirmed, the procedure moves to S816. Otherwise, the procedure moves to S818.

At S816, a Frame-Compatible mode is activated. At S818, a Service-Compatible mode is activated.

At S820, it is confirmed whether the PMT has been completely read. If the PMT has been completely read, the procedure moves to S830. If the PMT has not been completely read, the procedure moves to S822. At S822, stream_type and elementary_PID are read.

At S824, a descriptor length is confirmed using ES_info_length.

At S826, it is confirmed whether all descriptors related to ES info have been read. If all descriptors have been read, the procedure moves to S810. If all descriptors have not been read, the procedure moves to S828.

At S828, one descriptor related to ES info is read and the procedure moves to S826. At S830, CRC_32 is read and a data error is verified.

Although the above description is focused on a 3D stereoscopic broadcast, which is being currently tested and broadcast standards of which are under establishment, broadcasting in the frame-compatible mode and in the service-compatible mode may be performed in other composite broadcasts, such as a UHD TV broadcast and a multi-view broadcast. Consequently, the present invention is applicable to other composite broadcasts, such as a UHD TV broadcast and a multi-view broadcast, as well as a 3D stereoscopic broadcast.

Although the present invention has been described with reference to the embodiments shown in the drawings, the embodiments are illustrative. Therefore, those skilled in the art will appreciate that various and equivalent modifications may be embodied from the above embodiments.

The invention claimed is:

1. A method of transmitting a stereoscopic three dimensional (3D) service in a digital transmitter, the method comprising:

encoding video data of the stereoscopic 3D service;

multiplexing the encoded video data with signaling data; and transmitting a transport stream (TS) comprising the multiplexed data to a digital broadcast receiver, wherein the signaling data comprises a Program Map Table (PMT) including a stream_type field and multiple descriptors associated with 3D service, and a base view video of service-compatible stereoscopic 3D services is signaled using the stream_type value 0x02, further an additional view video for the service-compatible stereoscopic 3D services is signaled using the stream_type value 0x22 or 0x23, wherein a first descriptor among the multiple descriptors associated with 3D service comprises information identifying whether the stereoscopic 3D service is either a frame-compatible stereoscopic 3D service, or a service-compatible stereoscopic 3D service, and wherein a second descriptor among the multiple descriptors associated with 3D service provides information related to the service-compatible stereoscopic 3D service, further the second descriptor is included for both the base view video and the additional view video in the PMT for programs that support the service-compatible stereoscopic 3D service, the additional view video's stream_type value being 0x22 or 0x23.

2. The method of claim 1, wherein a frame containing combined left and right images is transmitted through a transmission band in the frame-compatible stereoscopic 3D service, and a left image frame and a right image frame are independently compressed and transmitted through a different transmission band in the service-compatible stereoscopic 3D service.

3. The method of claim 1, wherein the second descriptor provides information on a resolution relationship between a right view resolution and a left view resolution of the stereoscopic 3D service.

4. The method of claim 3, wherein the second descriptor provides information on a value of the right view resolution which is different with a value of the left view resolution and the value of the right view resolution has a value from one of ¾, ⅔ and ½ of the left view resolution.

5. The method of claim 1, wherein the first descriptor and the second descriptor are located in the PMT differently from each other.

6. The method of claim 5, wherein the first descriptor is located in a loop of a program_info_length field of the PMT and the second descriptor is located in a loop of an ES_info_length field of the PMT.

* * * * *